(12) United States Patent
Nam et al.

(10) Patent No.: US 9,662,865 B2
(45) Date of Patent: *May 30, 2017

(54) STRETCHED LAMINATE, METHOD OF MANUFACTURING THIN POLARIZER, THIN POLARIZER MANUFACTURED BY THE METHOD, AND POLARIZING PLATE INCLUDING THE THIN POLARIZER

(71) Applicant: LG Chem, Ltd., Seoul (KR)

(72) Inventors: Sung Hyun Nam, Daejeon (KR); Jong-Hyun Jung, Daejeon (KR); Kyun-Ii Rah, Daejeon (KR); Hye-Min Yu, Daejeon (KR); Se-Woo Yang, Daejeon (KR); Yoon-Tae Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 92 days.

This patent is subject to a terminal disclaimer.

(21) Appl. No.: 14/387,435

(22) PCT Filed: Jun. 16, 2014

(86) PCT No.: PCT/KR2014/005244
§ 371 (c)(1),
(2) Date: Sep. 23, 2014

(87) PCT Pub. No.: WO2014/204148
PCT Pub. Date: Dec. 24, 2014

(65) Prior Publication Data
US 2015/0224746 A1    Aug. 13, 2015

(30) Foreign Application Priority Data

Jun. 18, 2013  (KR) .................. 10-2013-0069839
Jun. 12, 2014  (KR) .................. 10-2014-0071688

(51) Int. Cl.
B32B 27/08    (2006.01)
B32B 38/00    (2006.01)
(Continued)

(52) U.S. Cl.
CPC ............ B32B 27/08 (2013.01); B32B 27/205 (2013.01); B32B 27/306 (2013.01); B32B 27/32 (2013.01);
(Continued)

(58) Field of Classification Search
CPC ........ B32B 2038/0028; B32B 2250/24; B32B 2307/4026; B32B 2307/42;
(Continued)

(56) References Cited

U.S. PATENT DOCUMENTS 8,411,360 B2    4/2013  Kitagawa et al.
9,158,051 B2 *  10/2015 Nam et al.
(Continued)

FOREIGN PATENT DOCUMENTS

EP    2405288 A1    1/2012
JP    61-104847 A    5/1986
(Continued)

OTHER PUBLICATIONS

Extended European Search Report dated Jan. 21, 2016 in European Patent Application No. 14765836.3 (7 pages).

*Primary Examiner* — Thao T Tran
(74) *Attorney, Agent, or Firm* — Dentons US LLP (57) ABSTRACT

Provided is a stretched laminate for manufacturing a thin polarizer while increasing the degree of orientation of a polyvinyl alcohol-iodine complex without problems such as breakage. In addition, there are provided a method of manufacturing a thin polarizer having superior optical char-
(Continued)

acteristics by using the stretched laminate, a thin polarizer manufactured by the method, and a polarizing plate including the thin polarizer.

9 Claims, 1 Drawing Sheet (51) Int. Cl.
| | |
|---|---|
| B32B 27/40 | (2006.01) |
| B32B 27/32 | (2006.01) |
| B32B 37/20 | (2006.01) |
| B32B 43/00 | (2006.01) |
| G02B 5/30 | (2006.01) |
| B32B 27/20 | (2006.01) |
| B32B 27/30 | (2006.01) |

(52) U.S. Cl.
CPC ............ *B32B 27/40* (2013.01); *B32B 37/203* (2013.01); *B32B 38/0012* (2013.01); *B32B 43/006* (2013.01); *G02B 5/30* (2013.01); *G02B 5/3033* (2013.01); *B32B 2038/0028* (2013.01); *B32B 2250/24* (2013.01); *B32B 2307/4026* (2013.01); *B32B 2307/42* (2013.01); *B32B 2307/516* (2013.01); *B32B 2329/04* (2013.01); *B32B 2375/00* (2013.01); *B32B 2551/00* (2013.01); *Y10T 428/31573* (2015.04); *Y10T 428/31855* (2015.04)

(58) Field of Classification Search
CPC .......... B32B 2307/516; B32B 2329/04; B32B 2375/00; B32B 2551/00; B32B 27/08; B32B 27/205; B32B 27/306; B32B 27/32; B32B 27/40; B32B 37/203; B32B 308/0012; B32B 43/006; G02B 5/30; G02B 5/3033; Y10T 428/31573; Y10T 428/31576; Y10T 428/31855

USPC .......................... 428/424.4; 427/163.1, 171
See application file for complete search history.

(56) References Cited

U.S. PATENT DOCUMENTS

| | | | |
|---|---|---|---|
| 9,304,239 B2* | 4/2016 | Nam et al. ........... | G02B 5/3033 |
| 2010/0136354 A1* | 6/2010 | Taniguchi ............. | B29C 55/005 |
| | | | 428/500 |
| 2011/0315306 A1 | 12/2011 | Goto et al. | |
| 2012/0058291 A1 | 3/2012 | Kitagawa et al. | |
| 2012/0058321 A1 | 3/2012 | Goto et al. | |
| 2015/0301252 A1* | 10/2015 | Nam et al. ........... | G02B 5/3033 |
| 2015/0309234 A1 | 10/2015 | Nam et al. | |
| 2016/0016388 A1* | 1/2016 | Nam et al. ............. | B32B 27/08 |
| 2016/0018577 A1* | 1/2016 | Nam et al. ............. | G02B 5/305 |
| 2016/0085005 A1* | 3/2016 | Nam et al. ............. | G02B 5/305 |
| 2016/0103259 A1* | 4/2016 | Nam et al. ........... | G02B 5/3033 |
| 2016/0103260 A1* | 4/2016 | Nam et al. ........... | G02B 5/3033 |

FOREIGN PATENT DOCUMENTS

| | | |
|---|---|---|
| JP | 63-243143 A | 10/1988 |
| JP | 2000-338329 4 A | 12/2000 |
| JP | 4751481 B1 | 5/2011 |
| JP | 4751486 B2 | 5/2011 |
| JP | 2011-131509 A | 7/2011 |
| JP | 2012-022044 A | 2/2012 |
| JP | 2012-032834 A | 2/2012 |
| JP | 2012-118521 A | 6/2012 |
| JP | 2012-145766 A | 8/2012 |
| KR | 10-2012-0025428 | 3/2012 |
| TW | 201311429 A1 | 3/2013 |
| WO | 2012096079 A1 | 7/2012 |
| WO | 2014077599 A1 | 5/2014 |
| WO | 2014077636 A1 | 5/2014 |

* cited by examiner

STRETCHED LAMINATE, METHOD OF MANUFACTURING THIN POLARIZER, THIN POLARIZER MANUFACTURED BY THE METHOD, AND POLARIZING PLATE INCLUDING THE THIN POLARIZER

This application is a National Stage Entry of International Application No. PCT/KR2014/005244, filed Jun. 16, 2014, and claims the benefit of Korean Application No. 10-2013-0069839 filed on Jun. 18, 2013, and Korean Application No. 10-2014-0071688, filed Jun. 12, 2014, all of which are hereby incorporated by reference in their entirety for all purposes as if fully set forth herein.

TECHNICAL FIELD

The present disclosure relates to a stretched laminate, a method of manufacturing a thin polarizer, a thin polarizer manufactured by the method, and a polarizing plate including the thin polarizer.

BACKGROUND ART

Polarizers included in polarizing plates are optical devices for polarizing natural light or arbitrarily polarized light in a particular direction, and are widely used in display devices such as liquid crystal displays (LCDs) or organic light emitting diode (OLED) displays. Currently, polyvinyl alcohol-based polarizing films, containing an iodine-based compound or a dichroic dye and having a molecular structure in which molecular chains are oriented in a particular direction, are generally used as polarizers of display devices.

As disclosed in many patent documents of the related art, polyvinyl alcohol-based polarizing films are commonly manufactured by dyeing a polyvinyl alcohol-based film with iodine or a dichroic dye, stretching the polyvinyl alcohol-based film in a particular direction, and performing a cross-linking process. In this case, the stretching process may be a wet stretching process using a solution such as an aqueous boric acid solution or an aqueous iodine solution, or a dry stretching process performed in the atmosphere.

The optical characteristics of a polarizing plate including such a polyvinyl alcohol-based polarizing film are predominantly affected by an iodine complex functioning as a dichroic dye, and it is important to increase the degree of orientation of a polyvinyl alcohol-iodine complex for improving optical characteristics of the polarizing plate. However, it may be difficult to improve the degree of orientation of such an iodine complex.

Furthermore, in the above-described manufacturing process of the related art, the thickness of a polyvinyl alcohol-based film has to be 60 μm or greater before stretching so as to prevent breakage of the polyvinyl alcohol-based film during stretching. In this case, however, there is a limit to reducing the thickness of a polarizer by stretching.

Therefore, there is a need for a new technique for manufacturing a thin polarizer having a thickness of 10 μm or less without failures such as breakages, while improving the optical characteristics of the thin polarizer by increasing the degree of orientation of a polyvinyl alcohol-iodine complex.

DISCLOSURE

Technical Problem

An aspect of the present disclosure may include a stretched laminate for manufacturing a thin polarizer while increasing the degree of orientation of a polyvinyl alcohol-iodine complex without problems such as breakages. Other aspects of the present disclosure may provide a method of manufacturing a thin polarizer having superior optical characteristics by using the stretched laminate, a thin polarizer manufactured by the method, and a polarizing plate including the thin polarizer.

Technical Solution

According to an aspect of the present disclosure, a stretched laminate may be formed by stretching a laminate including: a non-stretched polymer film; and a non-stretched polyvinyl alcohol-based film attached to at least one surface of the non-stretched polymer film, wherein P, expressed by Formula 1 below, ranges from 0.85 to 1.15, $$P = \frac{\left(\frac{W_{PVA}}{W_{o,PVA}}\right)}{\left(\frac{W_{sub'}}{W_{o,sub'}}\right)} \qquad \text{[Formula 1]}$$

where $W_{o,sub'}$ refers to a width of the polymer film before stretching, $W_{sub'}$ refers to a width of the polymer film after stretching, $W_{o,PVA}$ refers to a width of the polyvinyl alcohol-based film before stretching, and $W_{PVA}$ refers to a width of the polyvinyl alcohol-based film after stretching.

The polymer film may have a maximum stretching ratio of 5 times or greater at a temperature of 20° C. to 80° C. For example, the polymer film may be a high-density polyethylene film, a thermoplastic polyurethane film, a polypropylene film, a polyolefin film, an ester-based film, a low-density polyethylene film, a film formed by coextruding high-density polyethylene and low-density polyethylene, a copolymerization resin film in which ethylene vinyl acetate is included in high-density polyethylene, an acrylic film, a polyethylene terephthalate film, a polyvinyl alcohol-based film, and a cellulose-based film. Particularly, the polymer film may be a thermoplastic polyurethane film.

According to another aspect of the present disclosure, a method of manufacturing a thin polarizer may include: forming a laminate by attaching a non-stretched polyvinyl alcohol-based film to at least one surface of a non-stretched polymer film; and stretching the laminate such that P, expressed by Formula 1 below, ranges from 0.85 to 1.15, $$P = \frac{\left(\frac{W_{PVA}}{W_{o,PVA}}\right)}{\left(\frac{W_{sub'}}{W_{o,sub'}}\right)} \qquad \text{[Formula 1]}$$

where $W_{o,sub'}$ refers to a width of the polymer film before stretching, $W_{sub'}$ refers to a width of the polymer film after stretching, $W_{o,PVA}$ refers to a width of the polyvinyl alcohol-based film before stretching, and $W_{PVA}$ refers to a width of the polyvinyl alcohol-based film after stretching.

The forming of the laminate may include attaching the non-stretched polymer film and the non-stretched polyvinyl alcohol-based film to each other by using attractive force or an adhesive.

The stretching of the laminate may be performed in such a manner that the polyvinyl alcohol-based film may have a thickness of 60 μm or less before the stretching and a 10 μm or less after the stretching.

The stretching of the laminate may be performed within a temperature range of 20° C. to 80° C. at a stretching ratio of 5 times to 15 times. The stretching of the laminate may be performed in an aqueous boric acid solution having a boric acid content of 1 wt % to 5 wt %. Alternatively, the stretching of the laminate may be performed using a dry stretching method within a temperature range of 20° C. to 80° C. at a stretching ratio of 5 times to 15 times.

After the stretching of the laminate, a width of the polymer film measured in a direction perpendicular to a stretching direction may be reduced by 30% to 80% as compared to that of the polymer film measured before the stretching, and a thickness of the polymer film may be reduced by 30% to 80% as compared to that of the polymer film measured before the stretching.

After the stretching of the laminate, adhesive force between the stretched polyvinyl alcohol-based film and the stretched polymer film may be about 2 N/2 cm or less, about 0.1 N/2 cm to about 2 N/2 cm, or about 0.1 N/2 cm to about 1 N/2 cm.

Before the stretching of the laminate, the method may further include dyeing the non-stretched polyvinyl alcohol-based film with one or more of iodine and a dichroic dye. In detail, the method may further include: swelling the non-stretched polyvinyl alcohol-based film; and then dyeing the non-stretched polyvinyl alcohol-based film with iodine and/or a dichroic dye.

After the stretching of the laminate, the method may further include separating the stretched polyvinyl alcohol-based film from the stretched polymer film. In this case, the separating of the stretched polyvinyl alcohol-based film from the stretched polymer film may be performed by applying peel force within the range of about 2 N/2 cm or less, or about 0.1 N/2 cm to about 2 N/2 cm.

According to another aspect of the present disclosure, a thin polarizer may be manufactured by the above-described method and may have a thickness of 10 μm or less, a single transmittance of 40% to 45%, a degree of polarization of 99.0% or greater, and a standard deviation of 0.002% or less calculated from degrees of polarization measured at 10 points located at regular intervals in a width direction of the thin polarizer. According to another aspect of the present disclosure, a polarizing plate may include the thin polarizer.

Advantageous Effects

According to the present disclosure, since the degree of orientation of a polyvinyl alcohol-iodine complex can be improved, a thin polarizer having a thickness of 10 μm or less and superior optical characteristics may be manufactured.

Furthermore, according to the present disclosure, a polymer film and a polyvinyl alcohol-based film may not be separated from each other during a stretching process, and surfaces of the films may be minimally damaged during a separating process after the stretching process. Therefore, the stability of the stretching process may be high.

Furthermore, according to the present disclosure, high-ratio stretching is possible. In addition, a low-temperature dry stretching process and a wet stretching process using an aqueous boric acid solution are possible.

BEST MODE

Embodiments of the present disclosure will now be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The inventors have repeatedly conducted research into developing a method of manufacturing a thin polarizer having a thickness of 10 μm or less while increasing the degree of orientation of a polyvinyl alcohol-iodine complex and preventing problems such as breakage. As a result, the inventors have found that the objects as described above can be realized if particular behaviors of a polymer film and of a polyvinyl alcohol-based film are similar when the polymer film and the polyvinyl alcohol-based film are attached to each other and simultaneously stretched. Based this knowledge, the inventors have invented the present invention.

Hereinafter, the invention invented by the inventors will be described in more detail.

[Stretched Laminate]

First, an explanation will be given of a stretched laminate that may be used for the manufacturing of a thin polarizer according to the present disclosure. The stretched laminate of the present disclosure is formed by stretching a laminate including: a non-stretched polymer film; and a non-stretched polyvinyl alcohol-based film attached to at least one surface of the non-stretched polymer film, wherein P, expressed by Formula 1 below, ranges from 0.85 to 1.15, $$P = \frac{\left(\dfrac{W_{PVA}}{W_{o,PVA}}\right)}{\left(\dfrac{W_{sub'}}{W_{o,sub'}}\right)} \quad \text{[Formula 1]}$$

where $W_{o,sub'}$ refers to a width of the polymer film before stretching, $W_{sub'}$ refers to a width of the polymer film after stretching, $W_{o,PVA}$ refers to a width of the polyvinyl alcohol-based film before stretching, and $W_{PVA}$ refers to a width of the polyvinyl alcohol-based film after stretching.

The parameter P, as expressed by Formula 1, refers to a ratio of a width variation of the polyvinyl alcohol-based film caused by stretching to a width variation of the polymer film caused by stretching. In this specification, the parameter P may be referred to as a normalized width ratio and may preferably be within the range of about 0.85 to about 1.15, more preferably within the range of about 0.9 to about 1.1. If the normalized width ratio P is within the above-mentioned range, the polymer film and the polyvinyl alcohol-based film may behave similarly when being stretched, and thus the degree of orientation of a polyvinyl alcohol-iodine complex may be increased. As a result, a thin polarizer having superior optical characteristics may be manufactured.

In more detail, it is necessary to increase the degree of orientation of a polyvinyl alcohol-iodine complex for improving the degree of polarization of a polarizer, and this may be achieved by increasing the degree of widthwise shrinkage of the polyvinyl alcohol-based film. As compared with the case in which the normalized width ratio P of the stretched laminate is outside of the above-mentioned range, if the normalized width ratio P of the stretched laminate is within the above-mentioned range, the polymer film and the polyvinyl alcohol-based film may behave similarly when being stretched, and thus the degree of widthwise shrinkage of polyvinyl alcohol may increase. As a result, the degree of orientation of a polyvinyl alcohol-iodine complex may increase, and the degree of polarization of a polarizer may be improved.

In the present disclosure, when a normalized width ratio P is measured, the widths of the polymer film and the polyvinyl alcohol-based film may be measured before and after stretching by a method well known in the related art, for example, a method of using a general ruler.

(Polymer Film)

In the present disclosure, the polymer film is included in the laminate to prevent breakage of the polyvinyl alcohol-based film during stretching. The polymer film may have a maximum stretching ratio of 5 or more times, preferably within the range of about 5 times to about 15 times. The maximum stretching ratio refers to a stretching ratio immediately before breakage. Stretching may be performed using a dry stretching method or a wet stretching method. In the latter case, the maximum stretching ratio refers to a stretching ratio when stretching is performed in an aqueous boric acid having a boric acid content of about 1.0 wt to about 5.0 wt %.

Non-limiting examples of the polymer film may include a high-density polyethylene film, a thermoplastic polyurethane film, a polypropylene film, a polyolefin film, an ester-based film, a low-density polyethylene film, a film formed by coextruding high-density polyethylene and low-density polyethylene, a copolymerization resin film in which ethylene vinyl acetate is included in high-density polyethylene, an acrylic film, a polyethylene terephthalate film, a polyvinyl alcohol-based film, and a cellulose-based film.

Specifically, the polymer film may be a thermoplastic polyurethane film. However, the polymer film is not limited thereto. Since a thermoplastic polyurethane film has thermal shrinkage characteristics similar to those of the polyvinyl alcohol-based film, when the polyvinyl alcohol-based film is dried after stretching, the thermoplastic polyurethane film may not hinder widthwise shrinkage of the polyvinyl alcohol-based film but may allow smooth widthwise shrinkage. Therefore, the degree of orientation of a polyvinyl alcohol-iodine complex may be further improved.

Before stretching, the thickness of the polymer film may range from about 20 μm to about 100 μm, preferably from about 30 μm to about 80 μm. If the thickness of the polymer film is less than 20 μm, when a stack of the polymer film and the polyvinyl alcohol-based film is stretched, the polymer film may not sufficiently support the polyvinyl alcohol-based film to result in problems such as breakage. If the thickness of the polymer film is greater than 100 μm, the polymer film may have a high modulus and a low degree of stretchability and thus may hinder widthwise shrinkage of the polyvinyl alcohol-based film during a drying process. In this case, a polarizer obtained as a final product may have poor optical characteristics.

Although the thickness of the polymer film may be varied according to the amount of stretching, the thickness of the polymer film may preferably range, after stretching, from 4 μm to 70 μm, for example, from 6 μm to 70 μm, from 6 μm to 56 μm, or from 9 μm to 35 μm. In this case, the polymer film may prevent breakage of the polyvinyl alcohol-based film when the polyvinyl alcohol-based film is stretched at a high stretching ratio.

The glass transition temperature of the polymer film may preferably range from about 20° C. to about 60° C., for example, from about 30° C. to about 50° C. If the polymer film functioning as a base film has a glass transition temperature lower than that of the polyvinyl alcohol-based film generally ranging from 70° C. to 80° C., the polymer film may be relatively soft at a stretching temperature compared to the polyvinyl alcohol-based film, and thus the polyvinyl alcohol-based film may easily be stretched. However, if the glass transition temperature of the polymer film is too low, the polymer film may be broken when being stretched at a high stretching ratio. Therefore, it may be preferable that the polymer film have a glass transition temperature within the above-mentioned range. Glass transition temperatures may be measured with a differential scanning calorimeter (DSC). For example, a glass transition temperature may be measured with a DSC by putting about 10 mg of a sample in a dedicated pan, sealing the pan, and plotting the amounts of heat absorbed and generated during a phase transition of a material with respect to temperature while heating the pan at a constant heating rate.

Preferably, the modulus of the polymer film may range from 200 MPa to 1500 MPa, for example, from 350 MPa to 1300 MPa at room temperature (25° C.). If the modulus of the polymer film is greater than the above-mentioned range, high-ratio stretching may be difficult, and if the modulus of the polymer film is less than the above-mentioned range, the possibility of breakage is high during stretching. Herein, the modulus refers to a value measured according to JIS-K6251-1 by fixing both ends of a sample, applying a force in a direction perpendicular to a film thickness direction, and measuring stress per unit area with respect to strain. For example, a tester such as 2010 UTM by Zwick/Roell may be used for the measurement.

The polymer film may have a breaking force within a range of about 5 N to about 40 N, preferably about 10 N to about 30 N, at room temperature (25° C.). If the breaking force of the polymer film is greater than the above-mentioned range, high-ratio stretching may be difficult, and if the breaking force of the polymer film is less than the above-mentioned range, the possibility of breakage may be high during stretching. Herein, the breaking force refers to a force applied to the polymer film or a tensile force of the polymer film at the time point when the polymer film starts to break, and may be measured using a tester such as 2010 UTM by Zwick/Roell.

When the polymer film is stretched at room temperature (25° C.) with a stretching ratio of 6 times by a dry stretching method, the tensile force of the polymer film may range from about 5 N to about 200 N, preferably from about 10 N to about 100 N. In addition, when the polymer film is stretched at 52° C. with a stretching ratio of 6 times by a wet stretching method, the tensile force of the polymer film may range from about 1 N to about 100 N, preferably from about 2 N to about 80 N. If the tensile force of the polymer film is greater than the above-mentioned range, high-ratio stretching may be difficult, and if the tensile force of the polymer film is less than the above-mentioned range, the possibility of breakages may be high during stretching. The tensile force refers to a pulling force and may be, for example, measured by a tester such as 2010 UTM by Zwick/Roell.

(Polyvinyl Alcohol-Based Film)

The polyvinyl alcohol-based film attached to at least one surface of the polymer film may be used as a thin polyvinyl alcohol-based polarizer after being subjected to processes such as a stretching process and a dyeing process. Any film including a polyvinyl alcohol resin or a derivative thereof may be used as the polyvinyl alcohol-based film without limitations. Non-limiting examples of the derivative of a polyvinyl alcohol resin may include a polyvinyl formal resin and a polyvinyl acetal resin. In addition, any commercially available polyvinyl alcohol-based film used in the related art as a film for the manufacturing of a polarizer, such as M2000, M2001, M2005, M3000, and M6000 by Japan Synthetic Rubber, and P30, PE20, PE30, and PE60 by Kurary, may be used as the polyvinyl alcohol-based film.

Before stretching, the thickness of the polyvinyl alcohol-based film may range from about 60 μm or less, for example, from about 5 μm to about 60 μm, preferably from about 10 μm to about 40 μm. If the polyvinyl alcohol-based film is too thin, when the polyvinyl alcohol-based film forms a layer of a laminate and undergoes a stretching process, the polyvinyl alcohol-based film may easily be broken. On the other hand, if the polyvinyl alcohol-based film is too thick, the thickness of a final polarizer may be increased, and thus it may be difficult to manufacture a thin polarizer having a thickness of 10 μm or less.

After stretching, the polyvinyl alcohol-based film may have a thin thickness of about 10 μm or less, for example, about 1 μm to about 10 μm, preferably about 3 μm to about 8 μm. The polyvinyl alcohol-based film may be attached to one surface of the polymer film or both surfaces of the polymer film, and may then be stretched to a thickness of 10 μm or less.

The polyvinyl alcohol-based film may have a degree of polymerization within the range of about 1,000 to about 10,000, preferably about 1,500 to about 5,000. However, the polyvinyl alcohol-based film is not limited thereto. If the degree of polymerization of the polyvinyl alcohol-based film is within the above-mentioned range, molecules of the polyvinyl alcohol-based film may freely move and may be smoothly mixed with iodine or a dichroic dye.

In addition, the polyvinyl alcohol-based film may be a film dyed with iodine or a dichroic dye. For example, the polyvinyl alcohol-based film may be a film treated by a swelling process and a dyeing process.

[Method of Manufacturing Thin Polarizer]

Next, an explanation will be given of a method of manufacturing a thin polarizer using the above-described stretched laminate. The method of manufacturing a thin polarizer of the present disclosure includes forming a laminate by attaching a non-stretched polyvinyl alcohol-based film to at least one surface of a non-stretched polymer film; and stretching the laminate such that P, expressed by Formula 1 below, ranges from 0.85 to 1.15, $$P = \frac{\left(\frac{W_{PVA}}{W_{o,PVA}}\right)}{\left(\frac{W_{sub'}}{W_{o,sub'}}\right)} \quad \text{[Formula 1]}$$

where $W_{o,sub'}$ refers to a width of the polymer film before stretching, $W_{sub'}$ refers to a width of the polymer film after stretching, $W_{o,PVA}$ refers to a width of the polyvinyl alcohol-based film before stretching, and $W_{PVA}$ refers to a width of the polyvinyl alcohol-based film after stretching.

(Formation of Laminate)

In the present disclosure, a method of attaching the polyvinyl alcohol-based film to the polymer film is not limited. For example, the laminate may be formed as follows: a formation material for forming the polyvinyl alcohol-based film is applied to the polymer film by a coating method generally known in the related art such as a bar coating method, a reverse coating method, a gravure coating method, a spin coating method, a screen coating method, a fountain coating method, a spray coating method, or a comma coating method; and the formation material is dried. In another example, the laminate may be formed as follows: a formation material for forming the polymer film and a formation material for forming the polyvinyl alcohol-based film are supplied to a co-extruder generally used in the related art; and the thickness of the polymer film and the thickness of the polyvinyl alcohol-based film are properly controlled during co-extrusion.

Furthermore, in the present disclosure, the laminate may be formed by attaching the polymer film and the polyvinyl alcohol-based film to each other by using an adhesive. In this case, ingredients of the adhesive are not limited. For example, any one of adhesives known in the related art may be used. For example, the adhesive may be an aqueous adhesive or an ultraviolet (UV)-curable adhesive.

In more detail, the adhesive may be an aqueous adhesive including at least one selected from the group consisting of polyvinyl alcohol-based resins, acrylic resins, and vinyl acetate-based resins.

Alternatively, the adhesive may be an aqueous adhesive including a polyvinyl alcohol-based resin having an acryl group and a hydroxy group. The polyvinyl alcohol-based resin having an acryl group and a hydroxy group may have a degree of polymerization within the range of about 500 to about 1,800.

Alternatively, the adhesive may be an aqueous adhesive that includes a polyvinyl alcohol-based resin having an acetoacetyl group, and an amine-based metal compound cross-linking agent. In the case of an adhesive formed by adding an amine-based metal compound cross-linking agent to a polyvinyl alcohol-based resin having an acetoacetyl group, when the adhesive is hardened, a cross-linking reaction occurs between the amine-based metal compound cross-linking agent and the acetoacetyl group of the polyvinyl alcohol-based resin, and thus the water resistance of the adhesive is markedly improved after hardening. As a result, in a wet stretching process, the amount of the adhesive dissolving in water may be minimized, and thus the adhesive may be usefully used in the wet stretching process.

In more detail, the adhesive of the present disclosure may be an aqueous solution including a polyvinyl alcohol-based resin having an acetoacetyl group and an amine-based metal compound cross-linking agent, and the aqueous solution may have a pH of about 4.5 to about 9. If the pH of the adhesive is within the above-mentioned range, the adhesive may have improved storability, and durability in high-humidity environments. The pH of the adhesive may be adjusted by adding an acid such as nitric acid, hydrochloric acid, sulfuric acid, or acetic acid to an aqueous solution.

In the present disclosure, the adhesive may include 100 parts by weight of the polyvinyl alcohol-based resin having an acetoacetyl group, and 1 part by weight to 50 parts by weight of the amine-based metal compound cross-linking agent.

The degree of polymerization and degree of saponification of the polyvinyl alcohol-based resin are not limited as long as the polyvinyl alcohol-based resin has an acetoacetyl group. However, it may be preferable that the polyvinyl alcohol-based resin has a degree of polymerization within the range of 200 to 4,000 and a degree of saponification within the range of 70 mol % to 99.9 mol %. In terms of free molecular movement and smooth mixing of ingredients, it may be preferable that the polyvinyl alcohol-based resin have a degree of polymerization within the range of 1,500 to 2,500 and a degree of saponification within the range of 90 mol % to 99.9 mol %. In this case, it may be preferable that the polyvinyl alcohol-based resin have an acetoacetyl group content within the range of 0.1 mol % to 30 mol %. If the acetoacetyl group content is within the above-mentioned range, the polyvinyl alcohol-based resin may smoothly react with the amine-based metal compound cross-linking agent, and the water resistance of the adhesive may be sufficiently high.

The amine-based metal compound cross-linking agent may be a water-soluble cross-linking agent having a functional group reactive with the polyvinyl alcohol-based resin. In this regard, the amine-based metal compound cross-linking agent may be a metal complex having an amine-based ligand. A metal included as a central metal in the metal complex may be a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), or platinum (Pt). Any one having at least one amine group, such as primary amine, secondary amine (diamine), tertiary amine, or ammonium hydroxide, may be bonded as a ligand to the central metal. The content of the amine-based metal compound cross-linking agent may range from 1 part by weight to 50 parts by weight based on 100 parts by weight of the polyvinyl alcohol-based resin. In this case, the adhesive may have sufficient adhesiveness, and the storability (pot life) of the adhesive may be improved.

In the adhesive of the present disclosure, it may be preferable that the polyvinyl alcohol-based resin having an acetoacetyl group have a solid content within the range of about 1 wt % to about 10 wt %. If the solid content of the polyvinyl alcohol-based resin is less than 1 wt %, sufficient water resistance may not be obtained, and the possibility of breakage in a stretching process may not be effectively reduced. On the other hand, if the solid content of the polyvinyl alcohol-based resin is greater than 10 wt %, workability may be lowered, and the surface of the polyvinyl alcohol-based film may be damaged when the polyvinyl alcohol-based film is peeled.

Alternatively, the adhesive may be a UV-curable adhesive. For example, the adhesive may be a UV-curable adhesive including a first epoxy compound of which a homopolymer has a glass transition temperature of 120° C. or higher, a second epoxy compound of which a homopolymer has a glass transition temperature of 60° C. or lower, and a cationic photopolymerization initiator. In detail, the UV-curable adhesive may include 100 parts by weight of a first epoxy compound of which a homopolymer has a glass transition temperature of 120° C. or higher, 30 parts by weight to 100 parts by weight of a second epoxy compound of which a homopolymer has a glass transition temperature of 60° C. or lower, and 0.5 parts by weight to 20 parts by weight of a cationic photopolymerization initiator.

Herein, epoxy compounds refers to compounds having at least one epoxy group in molecules, for example, at least two epoxy groups in molecules, and the epoxy compounds may be monomers, polymers, resins, or combinations thereof. In the present disclosure, for example, the epoxy compounds may be resins.

The first epoxy compound may be used without particular limitations if the first epoxy compound is an epoxy compound of which a homopolymer has a glass transition temperature of 120° C. or higher. For example, an alicyclic epoxy compound and/or an aromatic epoxy compound of which a homopolymer has a glass transition temperature of 120° C. or higher may be used as the first epoxy compound according to the present disclosure. Specific examples of the epoxy compound of which a homopolymer has a glass transition temperature of 120° C. or higher may include 3,4-epoxycyclohexylmethyl-3,4'-epoxycyclohexanecarboxylate, vinyl cyclohexene dioxide, dicyclopentadiene dioxide, bis(epoxycyclopentyl) ether, bisphenol A-based epoxy compounds, and bisphenol F-based epoxy compounds. It may be more preferable that that the homopolymer of the first epoxy compound have a glass transition temperature of about 120° C. to about 200° C.

Next, the second epoxy compound may be used without particular limitations if the second epoxy compound is an epoxy compound of which a homopolymer has a glass transition temperature of 60° C. or lower. Examples of the second epoxy compound may include alicyclic epoxy compounds and aliphatic epoxy compounds. The alicyclic epoxy compounds may be bifunctional epoxy compounds, i.e., compounds having two epoxy groups. For example, the alicyclic epoxy compounds may be compounds in which two epoxy groups are all alicyclic epoxy groups. However, the alicyclic epoxy compounds are not limited thereto. The aliphatic epoxy compounds may be epoxy compounds that do not have alicyclic epoxy groups but have aliphatic epoxy groups. Examples of the aliphatic epoxy compounds may include: a polyglycidyl ether of an aliphatic polyalcohol; a polyglycidyl ether of an aliphatic polyalcohol-alkylene oxide adduct; a polyglycidyl ether of a polyester polyol of aliphatic polyalcohol and aliphatic polycarboxylic acid; a polyglycidyl ether of an aliphatic polycarboxylic acid; a polyglycidyl ether of a polyester polycarboxylic acid of aliphatic polyalcohol and aliphatic polycarboxylic acid; dimmers, oligomers or polymers obtained by vinyl polymerization of glycidyl acrylate or glycidyl methacrylate; and oligomers or polymers obtained by vinyl polymerization of glycidyl acrylate or glycidyl methacrylate and other vinyl-based monomers. For example, the aliphatic epoxy compounds may be polyglycidyl ethers of aliphatic polyalcohols or aliphatic polyalcohol-alkylene oxide adducts. However, the aliphatic epoxy compounds are not limited thereto.

The second epoxy compound of the present disclosure may include one or more of glycidyl ether groups. For example, the second epoxy compound of the present disclosure may include at least one selected from the group consisting of 1,4-cyclohexanedimethanoldiglycidyl ether, 1,4-butanedioldiglycidyl ether, 1,6-hexanedioldiglycidyl ether, neopentyldiglycidyl ether, resorcinol diglycidyl ether, diethylene glycol diglycidyl ether, ethylene glycol diglycidyl ether, trimethylolpropane triglycidyl ether, n-butyl glycidyl ether, 2-ethylhexyl glycidyl ether, phenyl glycidyl ether, and o-cresyl glycidyl ether.

It may be more preferable that that the homopolymer of the second epoxy compound have a glass transition temperature of about 0° C. to about 60° C.

In a non-limiting example of the present disclosure, the epoxy compounds may include a combination of a first epoxy compound having at least one epoxidized alicyclic group and a second epoxy compound having at least one glycidyl ether groups. Preferably, the weight ratio of the first epoxy compound and the second epoxy compound may be about 1:1 to about 3:1, more preferably 1:1 to 2:1, most preferably 1:1.

When the polymer film and the polyvinyl alcohol-based film are attached to each other by using the above-described adhesive and are not yet stretched, the thickness of an adhesive layer may range from about 20 nm to about 4,000 nm, preferably from about 20 nm to about 1,000 nm, more preferably from about 20 nm to about 500 nm. After the laminate is stretched, the thickness of the adhesive layer may range from about 10 nm to about 1,000 nm, preferably from about 10 nm to about 500 nm, more preferably from about 10 nm to about 200 nm. If the thickness of the adhesive layer is within the above-mentioned ranges before and after stretching, the polyvinyl alcohol-based film may be peeled without damage after stretching and drying processes.

In the present disclosure, alternatively, the laminate may be formed by attaching the polymer film and the polyvinyl alcohol-based film to each other by attractive force between the polymer film and the polyvinyl alcohol-based film without using any intermediate material. As described above, if the polymer film and the polyvinyl alcohol-based film are attached to each other by attractive force therebetween without using any intermediate material, the polymer film and the polyvinyl alcohol-based film may easily be separated after being stretched. That is, owing to a low peel force, the polyvinyl alcohol-based film may not be damaged during separation, and thus optical characteristics such as the degree of polarization of the polyvinyl alcohol-based film may not deteriorate.

In addition, if the polymer film and the polyvinyl alcohol-based film are attached to each other by attractive force therebetween without using any intermediate material, a thin polarizer having uniform properties may be manufactured, and a stretching process may be stably performed without errors such as breakage of films.

In the case in which the polymer film and the polyvinyl alcohol-based film are attached to each other by attractive force therebetween as described above, one or both sides of the polymer film or the polyvinyl alcohol-based film may be surface-treated before an attachment process so as to increase attractive force between the polymer film and the polyvinyl alcohol-based film. In this case, the surface treatment may be performed using a method well known in the related art such as a corona treatment method, a plasma treatment method, or a surface modification treatment method using an aqueous solution of a strong base such as NaOH or KOH.

(Stretching of Laminate)

After forming the laminate by attaching the polyvinyl alcohol-based film to the polymer film, the laminate is stretched until the laminate has a parameter P within the range of 0.85 to 1.15. It may be preferable that the parameter P, normalized width ratio, of the laminate range from about 0.85 to about 1.15, more preferably from about 0.9 to about 1.1. If the normalized width ratio P of the laminate is within the above-mentioned range, the polymer film and the polyvinyl alcohol-based film may behave similarly when being stretched, and thus the degree of orientation of a polyvinyl alcohol-iodine complex may be increased. As a result, a thin polarizer having superior optical characteristics may be manufactured.

Preferably, the laminate may be stretched such that the polyvinyl alcohol-based film may have a thickness of 60 μm or less before stretching and 10 μm or less after stretching, more preferably about 1 μm to about 10 μm or about 3 μm to about 8 μm after stretching.

A method for stretching the laminate is not limited. For example, the laminate may be uniaxially stretched in a longitudinal direction (machine direction MD) or a transverse direction TD. In addition, the laminate may be stretched in the transverse direction TD while simultaneously inducing shrinkage of the laminate in the machine direction MD. Examples of a method of stretching the laminate in the transverse direction TD may include a fixed end uniaxial stretching method in which an end of the laminate is fixed to a tenter. Examples of a method of stretching the laminate in the machine direction MD may include an inter-roll stretching method, an extrusion-stretching method, and a free-end uniaxial stretching method. In addition, the laminate may be stretched in multiple steps or may be stretched by a biaxial method or an inclined stretching method.

The stretching process may be performed using a wet stretching method. In this case, the adhesive force between surfaces of the base film (polymer film) and the polyvinyl alcohol-based film is relatively great as compared to the case of using a dry stretching method, and thus the stretching process may be stably performed. The wet stretching method may be performed using an aqueous boric acid solution, and in this case it may be preferable that the aqueous boric acid solution have a boric acid content within the range of about 1.0 wt % to about 5.0 wt %. If the stretching process is performed using an aqueous boric acid solution as described above, the possibility of breakage of the polyvinyl alcohol (PVA)-based film may be reduced owing to the cross-linking of a boric acid, and the stretching process may be stably performed. In addition, curling of the polyvinyl alcohol-based film that easily occurs in a wet process may be suppressed.

In general, polarizing devices are manufactured through processes such as water-washing, swelling, dyeing, washing, stretching, complementary coloring, and drying. In the present disclosure, the washing process and the stretching process may be performed using an aqueous boric acid solution. The washing process may preferably be performed using an aqueous boric acid solution having a boric acid content of about 0.1 wt % to about 2.5 wt %, more preferably about 0.5 wt % to about 2.0 wt %. The stretching process may preferably be performed using an aqueous boric acid solution having a boric acid content of about 1.0 wt % to about 5.0 wt %, more preferably about 1.5 wt % to about 4.5 wt %.

The stretching process may be performed using a wet stretching method at a temperature of 20° C. to 80° C. with a stretching ratio of 5 times to 15 times, preferably at a temperature of 40° C. to 60° C. or 45° C. to 55° C. with a stretching ratio of 5 times to 12 times or 6 times to 9 times.

The stretching process may be performed together with one or more one of a dyeing process in which the polyvinyl alcohol-based film is dyed with iodine and/or a dichroic dye and a cross-linking process in which the polyvinyl alcohol-based film is cross-linked with the iodine and/or the dichroic dye after the dyeing process.

Alternatively, the stretching process may be performed using a dry stretching method. In the present disclosure, the stretching process may be performed using a dry stretching method with a high stretching ratio of about 5 times to about 15 times, preferably 5 times to 12 times or 6 times to 9 times even at a low temperature ranging from 20° C. to 90° C., preferably from 50° C. to 80° C. In general, a polyvinyl alcohol-based film formed on a base film has a glass transition temperature within the range of 70° C. to 80° C., and thus if the polyvinyl alcohol-based film is stretched at a high temperature, problems such as damage or variations in physical properties may likely occur. In the present disclosure, however, since it is possible to perform the stretching process at a low temperature by a dry stretching method, such problems may not occur.

In the stretching process of the method of manufacturing a thin polarizer of the present disclosure, the laminate may be stretched in such a manner that the width of the polymer film in a direction perpendicular to a stretching direction may be reduced by preferably about 30% to about 80% or about 30% to about 70%, and the thickness of the polymer film may be reduced by preferably about 30% to about 80% or about 30% to about 70%. In this case, during the stretching process and a later drying process, the polymer film and the polyvinyl alcohol-based film may behave similarly while being stretched and reduced in width, and thus the degree of orientation of a polyvinyl alcohol-iodine complex may be increased.

After the laminate is stretched in the stretching process of the method of manufacturing a polarizer, the adhesive force between the polyvinyl alcohol-based film and the polymer film may be 2 N/2 cm or less, preferably about 0.1 N/2 cm to about 2 N/2 cm, more preferably about 0.1 N/2 cm to about 1 N/2 cm. If the adhesive force is within the above-mentioned range, surface damage may be minimized in a later separating process after the stretching process. In the method of manufacturing a thin polarizer of the present disclosure, if an adhesive layer is formed between the polyvinyl alcohol-based film and the polymer film, the adhesive layer may also be stretched in the stretching process, and thus the thickness of the adhesive layer may be reduced to about 10% to about 50% of the original thickness. As a result, the adhesive force between the polyvinyl alcohol-based film and the polymer film may be reduced to 2 N/2 Cm or less, and thus the polyvinyl alcohol-based film and the polymer film may easily be separated from each other.

Figure 1:
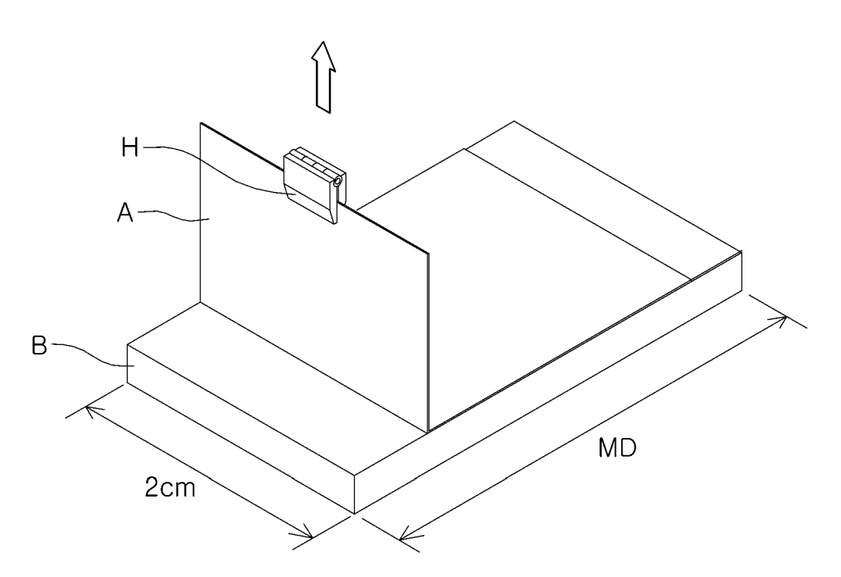
FIG. 1 is a schematic view illustrating a method of measuring adhesive force by using a texture analyzer.

Herein, the adhesive force refers to a value measured from 2-cm wide sample films. In detail, as shown in FIG. 1, after a polyvinyl alcohol-based film A of a laminate was fixed to a holder H, adhesive force was measured while peeling the polyvinyl alcohol-based film A off a polymer film B by applying a force in a direction perpendicular to the surface of the laminate. At this time, a texture analyzer (Model Name: TA-XT Plus) by Stable Micro Systems was used as a measuring tool.

(Other Processes)

The method of manufacturing a thin polarizer of the present disclosure may further include a process of dyeing the polyvinyl alcohol-based film with iodine and/or a dichroic dye before the stretching process. For example, before the stretching process, the polyvinyl alcohol-based film may be subjected to a swelling process and then a dyeing process in which the polyvinyl alcohol-based film is dyed with iodine and/or a dichroic dye.

In this case, the swelling process may be performed to facilitate adsorption and diffusion of the iodine and/or the dichroic dye in the non-stretched polyvinyl alcohol-based film and improve the stretchability of the non-stretched polyvinyl alcohol-based film. For example, in the swelling process, the non-stretched polyvinyl alcohol-based film or the non-stretched laminate may be immersed in pure water having a temperature of 25° C. to 30° C. for 5 second to 30 seconds, preferably 10 seconds to 20 seconds. However, the swelling process is not limited thereto. The swelling process may be performed until the non-stretched polyvinyl alcohol-based film has a degree of swelling within the range of about 36% to about 44%, preferably about 38% to about 42%. If the non-stretched polyvinyl alcohol-based film has a degree of swelling within the above-mentioned range, optical characteristics of a finally manufactured thin polarizer such as a degree of polarization may be superior. The degree of swelling is calculated by the formula: {(weight of polyvinyl alcohol-based film after swelling−weight of polyvinyl alcohol-based film before swelling)/weight of polyvinyl alcohol-based film before swelling}×100.

The drying process may be performed by putting the non-stretched polyvinyl alcohol-based film or the non-stretched laminate including the non-stretched polyvinyl alcohol-based film into a dyeing bath in which a dyeing solution having iodine and/or a dichroic dye is contained, or applying a dyeing solution having iodine and/or a dichroic dye to the non-stretched polyvinyl alcohol-based film. In this case, water may generally be used as a solvent of the dyeing solution. However, any other solvent compatible with water may also be included in the dyeing solution. The content of the iodine and/or the dichroic dye in the dyeing solution may be within the range of about 0.06 parts by weight to about 0.25 parts by weight based on 100 parts by weight of a solvent. In addition to the iodine and/or the dichroic dye, an adjuvant may be additionally included in the dyeing solution to improve dyeing efficiency. The adjuvant may be an iodide such as potassium iodide, lithium iodide, sodium iodide, zinc iodide, aluminum iodide, lead iodide, copper iodide, barium iodide, calcium iodide, tin iodide, titanium iodide, or a mixture thereof. The content of the adjuvant in the dyeing solution may be within the range of about 0.3 parts by weight to about 2.5 parts by weight based on 100 parts by weight of a solvent. Preferably, the weight ratio of iodine to an iodide may range from about 1:5 to about 1:10. In addition, the drying process may be performed at a temperature of about 25° C. to about 40° C. for a dyeing bath immersion time period of about 30 seconds to about 120 seconds. However, the drying process is not limited thereto.

In the method of manufacturing a thin polarizer, if necessary, the laminate may be subjected to a drying process after the stretching process. In this case, in terms of optical characteristics of a thin polarizer to be formed, the drying process may be performed at a temperature of about 20° C. to about 100° C., preferably 40° C. to 90° C. for a drying time period of about 1 minute to about minutes. However, the drying process is not limited thereto. The drying process is performed to remove moisture from the surface and inside of polyvinyl alcohol and to thus prevent deterioration of physical characteristics of a polyvinyl alcohol-based polarizer caused by moisture in a polarizing plate manufacturing process. In addition, the drying process induces smooth widthwise shrinkage of the polyvinyl alcohol-based film after the swelling process, thereby increasing the degree of orientation of a polyvinyl alcohol-iodine complex and the degree of polarization of a polarizer.

In the method of manufacturing a thin polarizer, if necessary, a separating process may be performed to separate the polyvinyl alcohol-based film from the polymer film after the swelling process. The separating process may be performed to separate the polyvinyl alcohol-based film from the polymer film by applying a small peel force to the polyvinyl alcohol-based film. The peel force may preferably be about 2 N/2 cm or less, for example, about 0.1 N/2 cm to about 2 N/2 cm or about 0.1 N/2 cm to about 1 N/2 cm. In the present disclosure, since the peel force is low, the two films may be easily separated without having to use an additional process or machine, and the polyvinyl alcohol-based film may be less damaged in the separating process. Therefore, optical characteristics of the polyvinyl alcohol-based film may be superior.

In the method of manufacturing a thin polarizer of the present disclosure, a process well known in the related art such as a sheet-to-sheet process, a sheet-to-roll process, or a roll-to-roll process may be performed. The sheet-to-sheet process may be performed using sheets of film cut into predetermined sizes as a raw material. The sheet-to-roll process may be performed using a long film wound in a roll as a raw material and sheets of film cut into predetermined sizes as another raw material. The roll-to-roll process may be performed using a roll of film as a raw material. In terms of process continuity and productivity, the roll-to-roll process may be used.

For example, the method of manufacturing a polarizer of the present disclosure may include: a process of forming a laminate by attaching a non-stretched polymer film and a non-stretched polyvinyl alcohol-based film to each other while unwinding a roll of the non-stretched polymer film and a roll of the non-stretched polyvinyl alcohol-based film; a process of stretching the laminate until the polymer film and the polyvinyl alcohol-based film satisfy the Formula 1; and a process of separating the polyvinyl alcohol-based film from the polymer film.

In this case, after the non-stretched polymer film and the non-stretched polyvinyl alcohol-based film are attached to each other, the films may be re-wound as a laminate roll and may then be stretched while unwinding the laminate roll, or the films may be directly stretched without re-winding.

In the separating process, the polymer film and the polyvinyl alcohol-based film may be separated from each other while inserting a peeling tool such as a peeling roll between surfaces of the films, and then the separated films may be respectively wound around rolls.

[Thin Polarizer and Polarizing Plate]

A thin polarizer manufactured by the above-described method has a thin thickness of about 10 μm or less, preferably about 1 μm to about 10 μm, more preferably about 3 μm to about 8 μm. Although the thin polarizer has a thin thickness, the thin polarizer has a single transmittance within the range of about 40% to about 45%, and a degree of polarization within the range of 99.0% or greater, preferably 99.5% or greater, more preferably 99.7% or greater, much more preferably 99.9% or greater.

The polarizer of the present disclosure manufactured by the above-described method has a high degree of uniformity in widthwise polarization. Specifically, the standard deviation of degrees of polarization measured at 10 points located at regular intervals in a width direction of the polarizer is 0.002% or less.

In the present disclosure, a polarizing plate may be formed by attaching a protective film to one or both surfaces of the polarizer. In this case, the structure of the polarizing plate is not limited as long as the polarizing plate includes the polarizer of the present disclosure. For example, the polarizing plate may have a structure of polarizer/protective film, protective film/polarizer, or protective film/polarizer/protective film.

The protective film supports and protects the polarizer and may be formed of a material generally known in the related art. Non-limiting examples of the protective film may include cellulose based films, polyethylene terephthalate (PET) films, cycloolefin polymer (COP) films, and acrylic films. An acrylic film may be used as the protective film in terms of optical characteristics, durability, and economic factors.

The polarizing plate may be manufactured through a process well known in the related art such as a sheet-to-sheet process, a sheet-to-roll process, or a roll-to-roll process. For example, the roll-to-roll process may be used. A method of manufacturing a polarizing plate by attaching a polarizer and a protective film through a roll-to-roll process is well-known in the related art, and thus a detailed description thereof will not be given. If the polarizing plate is manufactured through a roll-to-roll process, a large roll of the polarizing plate may be obtained.

The polarizing plate may include a retardation film to compensate for an optical phase difference. In the present disclosure, the retardation film is not limited to a particular type. For example, any one of retardation films generally used in the related art may be used according to various liquid crystal modes.

In addition to the retardation film, the polarizing plate may further include any other functional optical layer such as a brightness improving film, a primer layer, a hard coating layer, an anti-glare layer, an anti-reflection layer, or a bonding layer for attachment to a liquid crystal panel. A method of forming such an optical layer is not limited. For example, a method well known in the related art may be used.

The polarizing plate of the present disclosure may be used in various display devices. For example, the polarizing plate may be applied to various display devices such as liquid crystal displays (LCDs) and organic light emitting diode (OLED) displays.

MODE FOR INVENTION

Hereinafter, embodiments of the present disclosure will be described more specifically through examples.

Example 1

A laminate was formed by attaching 30 μm PVA films, PE30 grade by Kuraray, to both sides of a 30 μm thick thermoplastic polyurethane film. The thermoplastic polyurethane film was formed by reacting methylene diphenyl diisocyanate, 1,4-butanediol, neopentyl glycol, and adipic acid. The thermoplastic polyurethane film had a tensile modulus of 900 MPa and a breaking force of 24 N at 25° C., and a glass transition temperature of 40° C. A swelling process was performed on the laminate in 25° C. pure water for 15 seconds, and a dyeing process was performed on the laminate in a 25° C., 0.3 wt % iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 0.5 N/2 cm. In this manner, a thin polarizer having a thickness of 6.7 μm was manufactured.

Example 2

A laminate was formed by attaching 30 μm PVA films, PE30 grade by Kuraray, to both sides of a 60 μm thick thermoplastic polyurethane film. The thermoplastic polyurethane film was formed by reacting methylene diphenyl diisocyanate, 1,4-butanediol, neopentyl glycol, and adipic acid. The thermoplastic polyurethane film had a tensile modulus of 1,000 MPa and a breaking force of 30N at 25° C., and a glass transition temperature of 40° C. A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 0.2 N/2 cm. In this manner, a thin polarizer having a thickness of 7.5 μm was manufactured.

Example 3

A laminate was formed by attaching 20 μm PVA films, M2000 grade by Japan Synthetic Rubber, to both sides of a 40 μm thick thermoplastic polyurethane film. The thermoplastic polyurethane film was formed by reacting methylene diphenyl diisocyanate, 1,4-butanediol, neopentyl glycol, and adipic acid. The thermoplastic polyurethane film had a tensile modulus of 900 MPa and a breaking force of 28 N at 25° C., and a glass transition temperature of 37° C. A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 0.7 N/2 cm. In this manner, a thin polarizer having a thickness of 7.6 μm was manufactured.

Example 4

A laminate was formed by attaching 20 μm PVA films, M2000 grade by Japan Synthetic Rubber, to both sides of a 45 μm thick thermoplastic polyurethane film. The thermoplastic polyurethane film was formed by reacting methylene diphenyl diisocyanate, 1,4-butanediol, neopentyl glycol, and adipic acid. The thermoplastic polyurethane film had a tensile modulus of 1,015 MPa and a breaking force of 22 N at 25° C., and a glass transition temperature of 35° C. A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 1.2 N/2 cm. In this manner, a thin polarizer having a thickness of 7.8 μm was manufactured.

Example 5

A 4 wt % aqueous solution was prepared by dissolving polyvinyl alcohol having an acetoacetyl group content of 5 wt % (average degree of polymerization: 2000, degree of saponification: 94%, by Japan synthetic Rubber) in pure water. A titanium amine complex cross-linking agent (Product Name: TYZOR TE, Dupont) was added to the solution in an amount of 6.7 parts by weight based on 100 parts by weight of the polyvinyl alcohol, and the solution was agitated to form an adhesive. A laminate was formed by applying the adhesive to both sides of a 40 μm thick thermoplastic polyurethane film, attaching 20 μm PVA films, M2000 grade by Japan Synthetic Rubber, to both the sides of the 40 μm thick thermoplastic polyurethane film, and passing the films through a laminator. The thermoplastic polyurethane film was formed by reacting methylene diphenyl diisocyanate, 1,4-butanediol, neopentyl glycol, and adipic acid. The thermoplastic polyurethane film had a tensile modulus of 950 MPa and a breaking force of 18 N at 25° C., and a glass transition temperature of 39° C. A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 0.7 N/2 cm. In this manner, a thin polarizer having a thickness of 7.5 μm was manufactured.

Comparative Example 1

A laminate was formed by attaching PVA films (PE30 grade 30 μm PVA films by Kuraray) to both sides of a 75 μm thick low-density polyethylene film (RF7500AS grade by R&F). A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 1 wt % boric acid solution for 15 seconds, and a stretching process was performed on the laminate in a 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the low-density polyethylene film by applying a peel force of 9.1 N/2 cm. In this manner, a thin polarizer having a thickness of 5.8 μm was manufactured.

Comparative Example 2

A PVA film (M-grade PVA powder by Japan Synthetic Rubber, average degree of polymerization: 2400, average degree of saponification: 99 mol %) was dissolved in 100° C. pure water to prepare an aqueous PVA solution. Then, a 200 μm thick polyethylene terephthalate film (NOVA-Clear SG007 grade by MGC) was treated with corona and coated with the aqueous PVA solution by using a lip coater. Thereafter, the polyethylene terephthalate film was dried in an oven at 80° C. for 10 minutes. In this manner, a laminate was formed. The laminate had a 10 μm thick PVA coating layer. A swelling process was performed on the laminate in 25° C. pure water for 15 seconds, and a dyeing process was performed on the laminate in a 25° C. iodine solution having a boric acid content of 1.0 wt % and an iodine content of 0.3 wt % for 60 seconds. Thereafter, a washing process was performed on the laminate in a 25° C., 1 wt % boric acid solution for 15 seconds, and a stretching process was performed on the laminate in 70° C., 4.5 wt % boric acid solution to stretch the laminate with a stretching ratio of 5.5 times. After the stretching process, a complementary coloring process was performed on the laminate in a 5 wt % potassium iodide solution, and a drying process was performed in an oven at 80° C. for 5 minutes. After the drying process, a PVA film was peeled off the polyethylene terephthalate film by applying a peel force of 2.8 N/2 cm. In this manner, a thin polarizer having a thickness of 4.3 µm was manufactured.

Comparative Example 3

A laminate was formed by attaching 20 µm PVA films, M2000 grade by Japan Synthetic Rubber, to both sides of a µm thick thermoplastic polyurethane film. The thermoplastic polyurethane film was formed by reacting methylene diphenyl diisocyanate, 1,4-butanediol, neopentyl glycol, and adipic acid. The neopentyl glycol content of the thermoplastic polyurethane film was increased by 20% as compared to the neopentyl glycol content of the previous thermoplastic polyurethane films. The thermoplastic polyurethane film had a tensile modulus of 1,015 MPa and a breaking force of 22 N at 25° C., and a glass transition temperature of 35° C. A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 1.3 N/2 cm. In this way, a thin polarizer having a thickness of 7.3 µm was manufactured.

Comparative Example 4

A laminate was formed by attaching 20 µm PVA films, M2000 grade by Japan Synthetic Rubber, to both sides of a 45 µm thick thermoplastic polyurethane film. The thermoplastic polyurethane film was formed by reacting methylene diphenyl diisocyanate, 1,4-butanediol, neopentyl glycol, and adipic acid. The neopentyl glycol content of the thermoplastic polyurethane film was decreased by 20% as compared to the neopentyl glycol content of the previous thermoplastic polyurethane films. The thermoplastic polyurethane film had a tensile modulus of 1,600 MPa and a breaking force of 52 N at 25° C., and a glass transition temperature of 38° C. A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the thermoplastic polyurethane film by applying a peel force of 1.1 N/2 cm. In this way, a thin polarizer having a thickness of 6.7 µm was manufactured.

Experimental Example 1: Parameter Measurement

In each of the examples and comparative examples, widths of the polymer film and the polyvinyl alcohol-based film were measured before and after stretching by using a general ruler, and a value P was calculated as shown in Table 1 below.

TABLE 1

| NOs. | $W_{o,sub}$ [mm] | $W_{sub}$ [mm] | $W_{o,PVA}$ [mm] | $W_{PVA}$ [mm] | P |
|---|---|---|---|---|---|
| Example 1 | 90 | 48 | 80 | 48 | 1.125 |
| Example 2 | 90 | 48 | 80 | 47 | 1.102 |
| Example 3 | 90 | 38.7 | 80 | 30.8 | 0.895 |
| Example 4 | 90 | 32.4 | 80 | 30.4 | 1.056 |
| Example 5 | 80 | 30.2 | 80 | 30.2 | 1.000 |
| Comparative Example 1 | 90 | 49 | 80 | 52 | 1.194 |
| Comparative Example 2 | 81 | 46 | 81 | 56 | 1.217 |
| Comparative Example 3 | 90 | 28.8 | 80 | 30.0 | 1.172 |
| Comparative Example 4 | 90 | 45.0 | 80 | 31.2 | 0.780 |

As shown in Table 1, Examples 1 to 4 of the present disclosure resulted in values P (calculated by Formula 1) within the above-proposed range. However, Comparative Examples 1 to 3 resulted in values P greater than 1.15, and Comparative Example 4 resulted in a value P less than 0.85.

Experimental Example 2: Optical Property Measurement

Optical properties of the thin polarizers manufactured in the examples and comparative examples were measured by a spectrophotometer, JASCO V-7100, and measurement results are shown in Table 2 below.

TABLE 2

| NOs. | P | Single transmittance (%) | Degree of polarization (%) | Single color | | Perpendicular color | |
|---|---|---|---|---|---|---|---|
| | | | | a | b | a | b |
| Example 1 | 1.125 | 40.80 | 99.9521 | −0.84 | 1.38 | 1.21 | −3.45 |
| Example 2 | 1.102 | 40.48 | 99.9837 | −0.48 | 1.75 | 0.87 | −1.50 |
| Example 3 | 0.895 | 40.72 | 99.9873 | −0.74 | 1.68 | 0.84 | −1.45 |
| Example 4 | 1.056 | 40.81 | 99.9924 | −0.85 | 1.96 | 0.73 | −1.15 |
| Example 5 | 1.000 | 40.85 | 99.9931 | −0.87 | 2.01 | 0.71 | −1.10 |
| Comparative Example 1 | 1.194 | 40.17 | 98.9526 | 0.73 | 1.97 | 4.14 | 0.87 |

TABLE 2-continued

| NOs. | P | Single transmittance (%) | Degree of polarization (%) | Single color a | Single color b | Perpendicular color a | Perpendicular color b |
|---|---|---|---|---|---|---|---|
| Comparative Example 2 | 1.217 | 32.82 | 95.7737 | 2.54 | −0.30 | 6.72 | −5.39 |
| Comparative Example 3 | 1.172 | 40.67 | 98.8432 | −1.03 | 1.85 | 1.45 | −2.40 |
| Comparative Example 4 | 0.780 | 40.83 | 98.5938 | −1.68 | 1.36 | 1.78 | −2.92 |

In table 2, single transmittance refers to the transmittance of a single polarizer. The degree of polarization is $[(Tp-Tc)/(Tp+Tc)]^{0.5}$ where Tp refers to parallel transmittance of two polarizers, and Tc refers to perpendicular transmittance of two polarizers.

In addition, single colors a and b refer to colors measured from a single polarizer by using a color-difference meter, and perpendicular colors a and b refer to colors measured from a pair of polarizers disposed with absorption axes thereof being perpendicular to each other by using a color-difference meter.

In addition, colors a and b are color values in CIE coordinates. In detail, the color a is calculated by $a=500[(X/Xn)^{1/3}-(Y/Yn)^{1/3}]$, and +a refers to red and −a refers to green. The color b is calculated by $b=200[(Y/Yn)^{1/3}-(Z/Zn)^{1/3}]$, and +b refers to yellow and −b refers to blue. In the above, Xn, Yn, and Zn correspond to X, Y, and Z of a reference color, white.

That is, single colors a and b refer to CIE coordinate values measured from a single polarizer by using a color-difference meter, and perpendicular colors a and b refer to CIE coordinate values measured from a pair of polarizers disposed with absorption axes thereof being perpendicular to each other by using a color-difference meter.

Referring to Table 2 above, each of the thin polarizers of Examples 1 to 5 having parameters within the range proposed in the present disclosure has a degree of polarization equal to or greater than 99.9% (that is, having superior optical characteristics) because the degree of orientation of a polyvinyl alcohol-iodine complex is increased owing to similar behaviors of the polymer film and the polyvinyl alcohol-based film during a stretching process. However, the thin polarizers of Comparative Examples 1 to 4 having parameters outside of the range proposed by the present disclosure have relatively poor optical characteristics.

While exemplary embodiments have been shown and described above, it will be apparent to those skilled in the art that modifications and variations could be made without departing from the scope of the present disclosure as defined by the appended claims.

EXPLANATION OF REFERENCE NUMERAL

H: Holder
A: Polyvinyl alcohol-based film
B: Polymer film
MD: Longitudinal stretching direction

The invention claimed is:

1. A stretched laminate formed by stretching a laminate comprising:
   a non-stretched polymer film; and
   a non-stretched polyvinyl alcohol-based film attached to at least one surface of the non-stretched polymer film,
   wherein P, expressed by Formula 1 below, ranges from 0.85 to 1.15, $$P = \frac{\left(\frac{W_{PVA}}{W_{o,PVA}}\right)}{\left(\frac{W_{sub'}}{W_{o,sub'}}\right)} \qquad \text{[Formula 1]}$$

where $W_{o,sub'}$ refers to a width of the polymer film before stretching, $W_{sub'}$ refers to a width of the polymer film after stretching, $W_{o,PVA}$ refers to a width of the polyvinyl alcohol-based film before stretching, and $W_{PVA}$ refers to a width of the polyvinyl alcohol-based film after stretching,
   wherein the polymer film is a thermoplastic polyurethane film,
   wherein the polymer film and the polyvinyl alcohol-based film are attached to each other by using an attractive force therebetween or an adhesive, and
   wherein, in the stretched laminate, adhesive force between the polyvinyl alcohol-based film and the polymer film is 2N/2 cm or less.

2. A method of manufacturing a thin polarizer, the method comprising:
   forming a laminate by attaching a non-stretched polyvinyl alcohol-based film to at least one surface of a non-stretched polymer film; and
   stretching the laminate such that P, expressed by Formula 1 below, ranges from 0.85 to 1.15, $$P = \frac{\left(\frac{W_{PVA}}{W_{o,PVA}}\right)}{\left(\frac{W_{sub'}}{W_{o,sub'}}\right)} \qquad \text{[Formula 1]}$$

where $W_{o,sub'}$ refers to a width of the polymer film before stretching, $W_{sub'}$ refers to a width of the polymer film after stretching, $W_{o,PVA}$ refers to a width of the polyvinyl alcohol-based film before stretching, and $W_{PVA}$ refers to a width of the polyvinyl alcohol-based film after stretching,
   wherein the polymer film is a thermoplastic polyurethane film,
   wherein the forming of the laminate comprises attaching the polymer film and the polyvinyl alcohol-based film to each other by using an attractive force therebetween or an adhesive, and
   wherein, after the stretching of the laminate, adhesive force between the stretched polyvinyl alcohol-based film and the stretched polymer film is 2N/2 cm or less.

3. The method of claim 2, wherein the stretching of the laminate is performed in such a manner that the polyvinyl alcohol-based film has a thickness of 60 μm or less before the stretching and a thickness of 10 μm or less after the stretching.

4. The method of claim 2, wherein the stretching of the laminate is performed within a temperature range of 20° C. to 80° C. at a stretching ratio of 5 times to 15 times.

5. The method of claim 2, wherein the stretching of the laminate is performed in an aqueous boric acid solution having a boric acid content of 1 wt % to 5 wt %.

6. The method of claim 2, wherein after the stretching of the laminate, a width of the polymer film measured in a direction perpendicular to a stretching direction is reduced by 30% to 80% as compared to that of the polymer film measured before the stretching, and a thickness of the polymer film is reduced by 30% to 80% as compared to that of the polymer film measured before the stretching.

7. The method of claim 2, wherein before the stretching of the laminate, the method further comprises dyeing the non-stretched polyvinyl alcohol-based film with one or more of iodine and a dichroic dye.

8. The method of claim 2, wherein after the stretching of the laminate, the method further comprises separating the stretched polyvinyl alcohol-based film from the stretched polymer film.

9. The method of claim 8, wherein the separating of the stretched polyvinyl alcohol-based film from the stretched polymer film is performed by applying a peel force of 2 N/2 cm or less.

* * * * *